United States Patent [19]

Homan et al.

[11] 4,234,697

[45] Nov. 18, 1980

[54] METHOD OF PREPARING CROSS-LINKED POLYDIORGANOSILOXANE USING ORGANIC ISOCYANATES AND PRODUCTS PREPARED THEREFROM

[75] Inventors: Gary R. Homan; Chi-Long Lee, both of Midland, Mich.

[73] Assignee: Dow Corning Corporation, Midland, Mich.

[21] Appl. No.: 4,522

[22] Filed: Jan. 18, 1979

[51] Int. Cl.$^3$ .............................................. C08J 9/00
[52] U.S. Cl. .................................. 521/128; 521/170; 528/21; 528/28; 528/30; 528/33; 525/474
[58] Field of Search ...................... 521/128, 170, 99; 528/11, 21, 28, 30, 33

[56] References Cited

U.S. PATENT DOCUMENTS

| | | | |
|---|---|---|---|
| 3,070,555 | 12/1962 | Bruner, Jr. ............................ 260/2.5 |
| 3,445,419 | 5/1969 | Vanderlinde ......................... 260/37 |
| 3,816,282 | 6/1974 | Viventi ............................. 204/159.13 |
| 3,923,705 | 12/1975 | Smith ................................ 260/37 SB |
| 4,002,794 | 1/1977 | Schwarcz .............................. 528/28 |
| 4,039,504 | 8/1977 | Homan et al. ..................... 260/37 SB |
| 4,039,505 | 8/1977 | Homan et al. ..................... 260/37 SB |
| 4,064,027 | 12/1977 | Gant ................................. 204/159.13 |
| 4,066,603 | 1/1978 | Homan et al. ..................... 260/37 SB |
| 4,070,328 | 1/1978 | Homan et al. ..................... 260/37 SB |
| 4,070,526 | 1/1978 | Colquhoun ........................... 428/537 |

FOREIGN PATENT DOCUMENTS 2008426  2/1970  Fed. Rep. of Germany .

OTHER PUBLICATIONS

Encyclopedia of Polymer Science and Technology, vol. 15, pp. 449 and 450 (1971).

*Primary Examiner*—Melvyn I. Marquis
*Attorney, Agent, or Firm*—Roger H. Borrousch

[57] ABSTRACT

A crosslinked polydiorganosiloxane is prepared by mixing a mercapto-functional polydiorganosiloxane endblocked with organosiloxy units of formulae

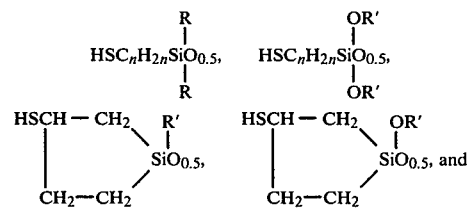

an organic diisocyanate, a catalyst, such as a tertiary organic amine and water. The resulting product is a sponge if the water is added in the liquid state or a non-porous elastomer if the water in the gas state is allowed to penetrate a blend of the polydiorganosiloxane, organic diisocyanate and tertiary organic amine. Density of sponge prepared by this method can range from about 35 kilograms per cubic meter to about 750 kilograms per cubic meter. A blend of the mercapto-functional polydiorganosiloxane, organic diisocyanate and tertiary organic amine can be used to make sponge by adding water in the liquid state or a non-porous elastomer by exposing it to air.

17 Claims, No Drawings

METHOD OF PREPARING CROSS-LINKED POLYDIORGANOSILOXANE USING ORGANIC ISOCYANATES AND PRODUCTS PREPARED THEREFROM

BACKGROUND OF THE INVENTION

1. Field of the Invention

This invention relates to a method of making cross-linked polydiorganosiloxane.

2. Description of the Prior Art

Polydiorganosiloxanes can be cross-linked by many methods. Some of these methods as known in the art include, the use of organic peroxides and heat, the use of gamma radiation, the use of ultraviolet radiation, the use of moisture sensitive cross-linking species such as monoorganotriacetoxysilane with certain catalysts, and the use of compounds containing silicon-bonded hydrogen and compounds containing silicon-bonded vinyl groups in the presence of a platinum catalyst. These methods represent a few means for cross-linking polydiorganosiloxane as found in the art where these methods can be grouped into two major categories, namely heat activated and room temperature vulcanized.

Vanderlinde in U.S. Pat. No. 3,445,419 describes compositions which cure to resins and elastomers. The compositions of Vanderlinde are prepared from the reaction product of a vinyl terminated organopolysiloxane and an ester of an organic polyol and an acid of the formula HOOCR"SH. These compositions cure when exposed to air in the presence of alkali. Viventi in U.S. Pat. No. 3,816,282 describes a composition comprising a polydiorganosiloxane containing silicon-bonded vinyl radicals, a mercaptopolysiloxane, a free radical source which cures to a silicone rubber when exposed to radiation. Gant in U.S. Pat. No. 4,064,027 and Colquhoun et al. in U.S. Pat. No. 4,070,526 also describe compositions comprising vinyl-containing silicon compounds and mercapto-functional siloxanes cured by radiation.

Compositions comprising certain vinyl-containing polydimethylsiloxanes, mercaptoorganopolysiloxanes and organic peroxides which cure to elastomers at room temperature or with heating are described by Homan and Lee in U.S. Pat. No. 4,039,504, U.S. Pat. No. 4,039,505 and U.S. Pat. No. 4,066,603.

Homan and Lee in U.S. Pat. No. 4,070,328 describe a composition of mercaptoorganopolysiloxane, organic hydroperoxide and a nitrogen compound which cures to elastomer. These inventors also describe a composition of a mercaptoorganopolysiloxane and organic peroxide which cures to an elastomer.

Bazant et al. in German Patent Publication (OLS) No. 2,008,426 discloses five different possibilities to make three dimensionally cross-linked silicone polymers. According to Bazant et al., these reactions were found to proceed in the presence of radical reaction initiators at a temperature of 30° to 110° C. or by UV light initiation. The five possibilities are defined as follows: One possibility is a reaction between a polydiorganosiloxane with vinyl radicals along the polymer chain and a polydiorganosiloxane with mercapto-alkyl endblocking groups. The second possibility is a reaction between a polydiorganosiloxane with vinyl radicals along the polymer chain and a polydiorganosiloxane with mercaptoalkyl endblocking groups. The third possibility is a reaction between a polydiorganosiloxane with vinyl endblocking groups and a polydiorganosiloxane with mercaptoalkyl groups along the polymer chain. The fourth possibility is a reaction of polydiorganosiloxanes which have both vinyl and mercaptoalkyl groups along the polymer chain.

The fifth possibility is reactions of high molecular thioalkylpolysiloxanes of the general formula

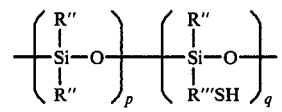

where R" is an alkyl group with 1 to 6 carbon atoms, a cycloalkyl group with 5 to 8 carbon atoms or aryl groups, R''' is an alkylene group with 1 to 6 carbon atoms, the sum of p+q is greater than 30 and q/p is from 1/10 to 1/60, or high molecular thioalkylpolysiloxane of the general formula $$HO(R''SiO_{1.5})_a(R''_2SiO)_b\{R''(HSR''')SiO\}_cOH$$

where a+b+c is greater than 5,

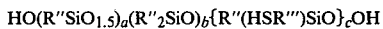

is from 1/5 to 1/60, and R" and R''' are defined above with organic diisocyanates, such as hexamethylene diisocyanate, toluene-2,4-diisocyanate, and benzene-1,4-diisocyanate. This reaction can be carried out in the aprotic solvent medium or without solvent at moderately elevated temperatures, preferably between 50° and 120° C. Also the addition of organic materials of a basic nature, such as tertiary amines in the amount of 0.5 to 7% by weight results in a considerable reduction in the time necessary to prepare the three dimensionally cross-linked polymer.

Siloxane sponge is known in the art. For the purpose of this application, the term sponge will be used, will mean a cellular elastomeric material and will include product types which are known as foams, for example, foam rubber. Siloxane sponge made by heating to activate a blowing agent and an organic peroxide are known. Siloxane sponge made at room temperature is also known. Bruner in U.S. Pat. No. 3,070,555 describes making a siloxane foam by mixing hydroxylated organopolysiloxane containing silicon-bonded hydrogen, a hydroxylated compound and a stannous salt of a hydrocarbon-soluble carboxylic acid and thereafter allowing the mixture to foam to an elastic product. A more recent method of making a siloxane foam is described by Smith in U.S. Pat. No. 3,923,705. Smith describes making an organosiloxane foam by mixing an organohydrogensiloxane, a hydroxylated organosiloxane and a platinum catalyst.

From the above art, it is apparent that polydiorganosiloxanes can be cross-linked by a number of ways including those which have mercapto functionality. It is also apparent that certain mercapto-functional polysiloxanes can be cross-linked with organic diisocyanates. It is, however, completely unexpected that polydiorganosiloxanes having mercapto endblocking groups can be used to make siloxane sponge or siloxane elastomers using organic diisocyanates as described below.

SUMMARY OF THE INVENTION

Cross-linked polydiorganosiloxane, especially siloxane sponge and siloxane elastomers, can be prepared by mixing a polydiorganosiloxane which is endblocked with organosiloxy units containing mercaptoalkyl radicals or mercapto silacyclopentane groups, an organic diisocyanate, a catalyst such as a tertiary organic amine and water. When the water in the liquid state is combined with the other ingredients, a siloxane sponge is obtained at room temperature. When the ingredients, except water, are combined and then exposed to water in the gas state, a siloxane elastomer is formed. A blend of mercapto-functional polydiorganosiloxane, organic diisocyanate and catalyst prepared under anhydrous conditions can be used to prepare sponge by mixing it with water in the liquid state or a non-porous elastomer by exposing it to water in the gas state, such as air.

DESCRIPTION OF THE INVENTION

This invention relates to a method of preparing a cross-linked polydiorganosiloxane comprising combining a mercapto-functional polydiorganosiloxane, an organic diisocyanate, and a catalyst such that a homogeneous mixture is formed, contacting the homogeneous mixture with water promoting cross-linking, and thereafter recovering a cross-linked polydiorganosiloxane, said mercapto-functional polydiorganosiloxane consisting essentially of a polydiorganosiloxane endblocked with organosiloxy units selected from units represented by unit formulae

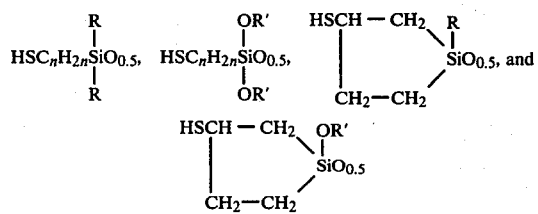

wherein the polydiorganosiloxane has organic radicals selected from phenyl radicals and alkyl radicals of one to four inclusive carbon atoms where at least 50 percent of the organic radicals of the polydiorganosiloxane are alkyl radicals, each R is phenyl radical or an alkyl radical of one to four inclusive carbon atoms, each R' is an alkyl radical of one to three inclusive carbon atoms, and n is an integer of from 2 to 4 inclusive, and there being at least one mole of isocyanate group from the organic diisocyanate for each mole of mercapto group from the mercapto-functional polydiorganosiloxane.

This method is a simple mixing procedure wherein the novelty resides primarily in the selection of the ingredients to be blended. The mixing procedure can be carried out by hand mixing the ingredients or by available commercial mixing equipment. Inasmuch as the primary requirement of the mixing is to provide a thorough blending of the ingredients and inasmuch as heating or cooling is not required, the equipment cost and the energy cost for large scale production of cross-linked polydiorganosiloxane is low compared to many other processes.

The method can produce siloxane sponge. To produce sponge, the mercapto-functional polydiorganosiloxane, organic diisocyanate, catalyst, and water in the liquid state are mixed. The mixing is preferably rapid, so that the resulting blend is homogeneous before the foaming and cross-linking begin. Rapid mixing produces a sponge which is more uniform throughout the blend mass than would be obtained by a slow mixing procedure. The gas formation and cross-linking can begin in time periods from a few seconds up to a few minutes as the ratios of the ingredients are changed. The sponge is formed in time periods of from about 30 seconds up to several minutes.

The mixing can be done by bringing the ingredients together in any suitable manner to form a blend which is substantially homogeneous. The preferred method is to prepare a mixture of mercapto-functional polydiorganosiloxane and organic diisocyanate to form a first mixture. A second mixture is prepared by combining the catalyst and water. Then, the two mixtures are blended when a sponge is to be made. Other methods of forming a blend can be used, for example, the mercapto-functional polydiorganosiloxane, organic diisocyanate and catalyst can be mixed and thereafter the water can be added when a sponge is to be made. If automatic metering equipment is used, all the ingredients can be metered into a mixer and the blend immediately dispensed to form sponge, such an arrangement could be used for continuous production of sponge.

The method using water in the liquid state allows one to make sponge of varying densities in short periods of time at room temperature. The densities of the sponge can readily be varied from about 35 kilograms per cubic meter ($kg/m^3$) to about 750 $kg/m^3$. A wide variety of densities are illustrated in the examples which can be used as a guide.

The time period observed for the gas formation to begin and the total time for sponge formation appears to be related to the amount of catalyst used. A minimum amount of catalyst appears to be necessary for satisfactory sponge formation. Catalysts which are compatible in the blend can be used in lower amounts than incompatible catalysts. The preferred catalysts are tertiary organic amines. These tertiary organic amines should be used in amounts greater than 0.75 weight percent based on the total weight of the blend, preferably in amount greater than 1.0 weight percent. The amounts of tertiary organic amine for best results will depend upon the particular amine selected. Amines, which are compatible with the blend require less amine to give the same results as other amines which are not as compatible. The most preferred amount of amine for making sponge is from 1.0 to 3.5 weight percent based on the weight of the blend.

The mercapto-functional polydiorganosiloxanes are those polydiorganosiloxanes which are endblocked with organosiloxy units each containing one mercapto group bonded to carbon as further defined herein. These polydiorganosiloxanes form the base for making the cross-linked polydiorganosiloxane by the present method. The amount of organic diisocyanate is related to the amount of mercapto groups in the mercapto-functional polydiorganaosiloxane. To make a sponge by this method, the amount of organic diisocyanate must be sufficient to provide more than one mole of isocyanate group for each mole of mercapto group in the mercapto-functional polydiorganosiloxane. Preferably, there is present enough organic diissocyanate to provide more than 1.2 moles of isocyanate group per mole of mercapto group in the mercapto-functional polydiorganosiloxane. The maximum amount of organic diisocyanate can be as high as 25 isocyanate groups per mercapto group. The most preferred range is 1.5 to 10 isocyanate groups per mercapto group. The amount of water used in the method to prepare sponge is sufficient to provide at least one mole of water for each mole of isocyanate in excess of one mole of isocyanate group per mole of mercapto group. Amounts of 1.2 to 5 moles of water for each mole of isocyanate in excess of one mole of isocyanate group per mole of mercapto group has been found to make satisfactory sponge and is thus preferred. Although the amount of water can be varied over a wide range, it is not recommended to use more than 20 moles of water for each mole of isocyanate in excess of one mole of isocyanate group per mole of mercapto group.

The present method for forming cross-linked polydiorganosiloxane can be used to make elastomer. Mixing the mercapto-functional polydiorganosiloxane, organic diisocyanate, and catalyst to form a blend and thereafter exposing this resulting blend to water in the gas state, such as the moisture of air, forms a non-porous elastomer. By the term "non-porous elastomer", it is to be understood that the elastomer does not contain a multitude of cells such as found in a sponge, but for all practical purposes it is a coherent solid. Blends formed by mixing a mercapto-functional polydiorganosiloxane, organic diisocyanate, and catalyst can gel if stored and thus should be used after preparation and before gellation. However, preparation of these blends permits the manufacture of either an elastomer or a sponge from a single composition.

The blend for making elastomer by the present method is essentially the same as the blend used to make the sponge, except water is initially excluded. The amounts of the other ingredients can also vary. The amount of organic diisocyanate can be such that there is at least one mole isocyanate group from the organic diisocyanate for each mole of mercapto group from the mercapto-functional polydiorganosiloxane. Smaller amounts of the catalyst can be used in the blends used to make compositions which cure to elastomer than is used to make sponge. For example, the preferred tertiary organic amine can be used in amounts of 0.1 weight percent based on the weight of the blend.

The blend for making elastomer can also be used to make sponge as long as the required amounts of organic diisocyanate and catalyst are in the ranges stated above for making sponge. Such blends can be either exposed to air at room temperature where an elastomer forms or rapidly mixed with water in the liquid state where a sponge forms. For blends which can be used to make both elastomer and sponge, the amounts of the ingredients are the same as for the sponge.

The mercapto-functional polydiorganosiloxane consists essentially of a polydiorganosiloxane endblocked with organosiloxy units selected from units of

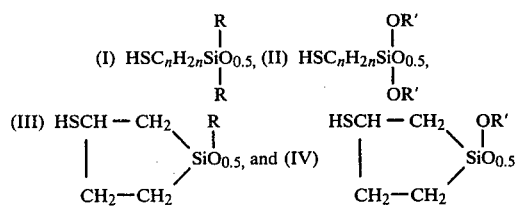

wherein the organic radicals of the polydiorganosiloxane are phenyl or alkyl of one to four carbon atoms, such as methyl, ethyl, propyl and butyl, each R is a radical selected from the same group as the organic radicals, R' is an alkyl of one to three carbon atoms and n is an integer of 2 to 4 inclusive. At least 50 percent of the organic radicals of the poly-diorganosiloxane are alkyl radicals. Preferably, the organic radicals of the mercapto-functional polydiorganosiloxane are all methyl, R and R' are each methyl, and n is 3. The preferred endblocking units for the mercapto-functional polydiorganosiloxane used in the method for preparing sponge is

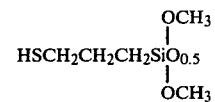

The mercapto-functional polydiorganosiloxanes which have the endblocking units of formula (I) are known in the art. The mercapto-functional polydiorganosiloxanes which have the endblocking units of formulae (III) and (IV) can be prepared by the method defined in U.S. Pat. No. 3,655,713 which is hereby incorporated by reference. The mercapto-functional polydiorganosiloxanes which have the endblocking units of formula (II) can be prepared by reacting a hydroxyl endblocked polydiorganosiloxane and a mercaptoalkyltrialkoxysilane of the formula $HSC_nH_{2n}Si(OR')_3$ in the presence of solid potassium hydroxide or potassium silanolate catalysts. The potassium silanolate catalyst is preferred for the higher viscosity polydiorganosiloxanes. The mercaptoalkyltrialkoxysilane is preferably used in an excess of about 10 mole percent over stoichiometric amounts. The resulting product is essentially a mercapto-functional polydiorganosiloxane endblocked with units of formula (II), but there may be some small amounts of units wherein two SiOH groups have reacted with one mercaptoalkyltrialkoxysilane molecule, however these amounts are small enough that the character of the endblocked polydiorganosiloxane is not noticeably altered.

The mercapto-functional polydiorganosiloxanes which are preferred in the method used to make sponge are those which are fluid. Fluid mercapto-functional polydiorganosiloxanes are preferred to permit rapid mixing when combining the mercapto-functional polydiorganosiloxane, organic diisocyanate and catalyst with the water. The most preferred mercapto-functional polydiorganosiloxanes are those which contain an average of from 3 to 800 diorganosiloxane units per molecule.

The organic diisocyanate can be selected from those known in the art. Examples of the organic diisocyanates are hexamethylene diisocyanate, 1,8-diisocyanato-p-menthane, xylylene diisocyanate, (OCNCH₂CH₂C-H₂OCH₂)₂O, 1-methyl-2,4-diisocyanatocyclohexane, diphenylmethane-4,4'-diisocyanate, naphthalene-1,5-diisocyanate, tolylene diisocyanates, such as 2,4-tolylene diisocyanate, 2,6-tolylene diisocyanate, and crude tolylene diisocyanate, bis(4-isocyanatophenyl)methane, dianisidine diisocyanate, toluidine diisocyanate, bis-(2-isocyanatoethyl)-fumarate, bis(2-isocyanatoethyl)carbonate, 1,6-hexamethylene-diisocyanate, 1,4-tetramethylene-diisocyanate, 1,10-deca-methylene-diisocyanate, cumene-2,4-diisocyanate, 4-methoxy-1,3-phenylene diisocyanate, 4-chloro-1,3-phenylenediisocyanate, 4-bromo-1,3-phenylene diisocyanate, 4-ethoxy-1,3-phenylenediisocyanate, 2,4'-diisocyanato-diphenylether, 5,6-dimethyl-1,3-phenylene diisocyanate, 2,4-dimethyl-1,3-phenylenediisocyanate, 4,4'-diisocyanatodiphenylether, bis 5,6-(2-isocyanatoethyl)bicyclo [2.2.1]hept-2-ene, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorened isocyanate, 1,8-naphthalenediisocyanate, and 2,6-diisocyanatobenzfuran. One organic diisocyanate or mixtures of two or more organic diisocyanates can be used. The preferred organic diisocyanate is tolylene diisocyanate.

The catalyst can include any of the catalysts used in producing conventional flexible polyurethane foam. The preferred catalyst in this invention is a tertiary organic amine, such as N-methyl morpholine, N-ethyl morpholine, triethylamine, dimethylbenzylamine, triethylene diamine, hexadecyl dimethylamine, N,N,N',N'-tetramethyl-1,3-butanediamine, N,N-dimethylethanolamine, bis(2-dimethylaminoethyl)ether, and N,N,N'N'-tetramethylethylenediamine. Mixtures of amines can be used. The preferred tertiary organic amine is triethylamine.

Other ingredients can be used such as pigments and colorants, flame retardant additives, fillers and surfactants. These additional ingredients should be selected by first trying a particular ingredient on a small scale to determine its effect on the final product before attempting large scale operations.

The sponge made by the method is useful as thermal insulation, sound absorbance and other uses known for polyurethane foam. The sponge of this invention is expected to exhibit advantages over polyurethane foam such as better low temperature properties and better high temperature properties. The elastomer prepared by the method can be used as a sealant, a coating, a caulk and other uses which are known for silicone compositions which cure by contact to moisture.

The following examples are presented for illustrative purposes and should not be construed as limiting the invention which is properly delineated in the claims. All parts are parts by weight unless otherwise specifically stated.

EXAMPLE 1

Sponge was made by making a first mixture of 50 parts of mercapto-functional polydiorganosiloxane and X parts of tolylene diisocyanate and a second mixture of 3 parts of water and Y parts of triethylamine. X and Y were as shown in Table I. The two mixtures were then combined using a high speed stirrer. The stirring was done for about 20 to 30 seconds. The time to start gassing was observed and determined from the point when the stirring was stopped to the first observance of gas bubbles. The time to form sponge was observed and determined from the point when the stirring was stopped to the point where no further expansion of the sponge was noticed. The time to start gassing was as shown in Table I under the heading "Start Gassing, sec." and the time to form sponge was as shown in Table I under the heading "Sponge Time, sec.". Table I also contains additional information. Shown under the heading "NCO/SH" are the moles of isocyanate group per mole of mercapto group, under the heading "Moles Water Excess" are the moles of water per mole of isocyanate group which is in excess of the moles of isocyanate group necessary to provide one mole isocyanate group per mole of mercapto group, under the heading "Weight % Amine" is the weight percent triethylamine based on the combined weight of the first mixture and the second mixture, under the heading "Average Cell Size, mm" is the average diameter of the cells in the sponge in millimeters, under the heading "Density, kg/m$^3$" is the density of the sponge in kilograms per cubic meter, and under the heading "Comments" are remarks related to the specific process or resulting sponge.

The specific mercapto-functional polydiorganosiloxane used to make sponge in each run by the method described above were as follows:

Polymer A: A mercapto-functional polydimethylsiloxane represented by the average formula $$\text{HSCH}_2\text{CH}_2\text{CH}_2(\text{CH}_3)_2\text{SiO}\{(\text{CH}_3)_2\text{SiO}\}_{6.6}\text{Si}(\text{CH}_3)_2\text{CH}_2\text{CH}_2\text{CH}_2\text{SH}$$

having 1.27 weight percent mercapto group.

Polymer B: A mercapto-functional polydimethylsiloxane represented by the average formula $$\text{HSCH}_2\text{CH}_2\text{CH}_2(\text{CH}_3\text{O})_2\text{SiO}\{(\text{CH}_3)_2\text{SiO}\}_{3.1}\text{Si}(\text{OCH}_3)_2\text{CH}_2\text{CH}_2\text{CH}_2\text{SH}$$

having 2.5 weight percent mercapto group.

Polymer C: A mercapto-functional polydimethylsiloxane represented by the average formula $$\text{HSCH}_2\text{CH}_2(\text{CH}_3)_2\text{SiO}\{(\text{CH}_3)_2\text{SiO}\}_{3.3}\text{Si}(\text{CH}_3)_2\text{CH}_2\text{CH}_2\text{SH}$$

having 2.43 weight percent mercapto group.

Polymer D: A mixture of 60 parts of Polymer A and 40 parts of Polymer B.

Polymer E: A mixture of 60 parts of Polymer A and 40 parts of Polymer C.

Polymer F: A mixture of 80 parts of Polymer A and 20 parts of Polymer C.

Polymer G: A mixture of 50 parts of Polymer A and 50 parts of Polymer C.

Polymer H: A mixture of 40 parts of Polymer A and 60 parts of Polymer C.

Polymer I: A mercapto-functional polydimethylsiloxane represented by the average formula $$\text{HSCH}_2\text{CH}_2\text{CH}_2(\text{CH}_3)_2\text{SiO}\{(\text{CH}_3)_2\text{SiO}\}_{8.9}\text{Si}(\text{CH}_3)_2\text{CH}_2\text{CH}_2\text{CH}_2\text{SH}$$

having 0.965 weight percent mercapto group.

Polymer J: A mixture of 40 parts of Polymer I and 60 parts of Polymer C.

Polymer K: A mixture of 60 parts of Polymer I and 40 parts of Polymer C.

Polymer L: A mercapto-functional polydimethylsiloxane represented by the average formula $$\begin{array}{c}\text{HSCH}-\text{CH}_2\quad\text{CH}_3\qquad\qquad\qquad\text{CH}_3\\ \qquad\qquad\backslash\ \ |\qquad\qquad\qquad\qquad|\ /\text{CH}_2-\text{CHSH}\\ \qquad\qquad\quad\text{Si}\text{O}\{(\text{CH}_3)_2\text{SiO}\}_{57}\text{Si}\\ \qquad\quad/\qquad\qquad\qquad\qquad\qquad\backslash\\ \text{CH}_2-\text{CH}_2\qquad\qquad\qquad\qquad\text{CH}_2-\text{CH}_2\end{array}$$

having 1.47 weight percent mercapto group.

Polymer M: A mercapto-functional polydimethylsiloxane represented by the average formula

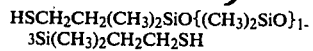

having 5.45 weight percent mercapto group.

Polymer N: A mercapto-functional polydimethylsiloxane represented by the average formula

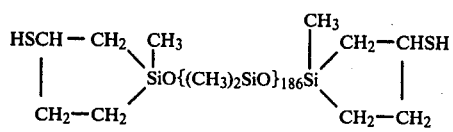

having 0.47 weight percent mercapto group.

Polymer O: A mercapto-functional polydimethylsiloxane represented by the average formula

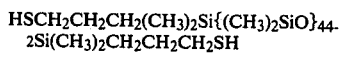

having 0.20 weight percent mercapto group.

Polymer P: A mixture of 20 parts of Polymer I and 80 parts of Polymer C.

Polymer Q: A mercapto-functional polydimethylsiloxane represented by the average formula

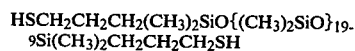

having 0.44 weight percent mercapto group.

TABLE I

| No. | Polymer | X | Y | Weight % Amine | NCO SH | Moles Water Excess | Start Gassing Seconds | Sponge Time Seconds | Average Cell Size, mm | Density kg/m³ | Comments |
|---|---|---|---|---|---|---|---|---|---|---|---|
| 1. | D | 13 | 1 | 1.49 | 5.60 | 1.36 | 5 | 52 | 0.8 | 35.9 | Small uniform cells. |
| 2. | D | 14 | 1 | 1.47 | 6.03 | 1.24 | 5 | 45 | 1.0 | 37.0 | small uniform cells. |
| 3. | D | 11 | 1 | 1.54 | 4.74 | 1.67 | 10 | 57 | — | 37.8 | — |
| 4. | D | 11 | 1 | 1.54 | 4.74 | 1.67 | 8 | 60 | 0.5 | 38.1 | Small uniform cells. |
| 5. | D | 12 | 1 | 1.52 | 5.16 | 1.50 | 8 | 55 | 0.5 | 38.8 | A very slight collapse at end of expansion. Very small uniform cells. |
| 6. | E | 10 | 1 | 1.56 | 4.37 | 1.88 | 15 | 85 | 0.5 | 40.4 | Small uniform cells. |
| 7. | E | 10 | 1 | 1.56 | 4.37 | 1.88 | 15 | 85 | 0.5 | 40.7 | Small uniform cells. |
| 8. | D | 10 | 1 | 1.56 | 4.30 | 1.89 | 10 | 60 | 0.5 | 42.8 | Small uniform cells. |
| 9. | G | 10 | 1 | 1.56 | 4.10 | 1.92 | 15 | 80 | 0.5 | 42.9 | Very small uniform cells. |
| 10. | H | 10 | 1 | 1.56 | 3.86 | 1.96 | 10 | 70 | 1.0 | 46.1 | Partial collapse occurred after 40 sec. expansion continued to 70 sec. Small non-uniform cells. |
| 11. | D | 9 | 1 | 1.59 | 3.87 | 2.17 | 15 | 65 | 0.4 | 49.0 | Very small uniform cells. |
| 12. | F | 10 | 1 | 1.56 | 5.05 | 1.81 | 15 | 65 | 1.2 | 53.7 | Very slight collapse observed. |
| 13. | A | 9.5 | 1 | 1.57 | 5.68 | 1.85 | 10 | 65 | 1.9 | 54.3 | — |
| 14. | A | 10 | 1 | 1.56 | 5.97 | 1.74 | 10 | 75 | — | 54.6 | — |
| 15. | A | 9 | 1.5 | 2.36 | 5.37 | 1.98 | 8 | 55 | — | 62.5 | — |
| 16. | A | 9 | 1 | 1.59 | 5.37 | 1.98 | 8 | 75 | — | 65.0 | Slight collapse observed. |
| 17. | J | 7 | 1 | 1.64 | 2.88 | 3.17 | 15 | 90 | — | 65.7 | Very small uniform cells. |
| 18. | A | 8.5 | 1.5 | 2.38 | 5.08 | 2.12 | 8 | 50 | — | 66.6 | Slight collapse observed. |
| 19. | A | 8.5 | 2.0 | 3.15 | 5.08 | 2.12 | 8 | 45 | — | 68.9 | Some collapse observed. |
| 20. | A | 7 | 1 | 1.67 | 4.18 | 2.72 | 10 | 70 | — | 68.9 | Small uniform cells. |
| 21. | A | 8.5 | 1 | 1.60 | 5.08 | 2.12 | 10 | 80 | — | 69.7 | — |
| 22. | A | 8 | 1 | 1.61 | 4.18 | 2.29 | 10 | 70 | — | 69.7 | — |
| 23. | K | 7 | 1 | 1.64 | 3.43 | 2.92 | 20 | 100 | — | 71.9 | Very small uniform cells |
| 24. | A | 8 | 1.5 | 2.40 | 4.78 | 2.29 | 8 | 55 | — | 74.8 | — |
| 25. | A | 7 | 1.5 | 2.44 | 4.18 | 2.72 | 10 | 60 | — | 76.6 | — |
| 26. | I | 6 | 1 | 1.67 | 4.72 | 3.06 | 10 | 90 | — | 82.0 | — |
| 27. | I | 6 | 0.5 | 0.84 | 4.72 | 3.06 | — | 300 | — | — | Slow expansion |
| 28. | I | 3 | 0.5 | 0.88 | 2.36 | 8.38 | — | 420 | — | — | Expanded very slowly |
| 29. | I | 7 | 1 | 1.64 | 5.51 | 2.53 | 15 | 70 | — | 85.9 | Non-uniformity observed. |
| 30. | I | 6 | 1.5 | 2.48 | 4.72 | 3.06 | 10 | 75 | — | 86.5 | — |
| 31. | I | 6.5 | 1 | 1.65 | 5.11 | 2.78 | 15 | 100 | — | 87.1 | Some non-uniformity |
| 32. | L | 6 | 1 | 1.67 | 3.10 | 3.57 | 20–30 | 300 | 1.1 | 91.6 | Uniform |
| 33. | I | 6 | 1.5 | 2.48 | 4.72 | 3.06 | 10 | 70 | — | 93.6 | — |
| 34. | I | 6 | 0.5 | 0.84 | 4.72 | 3.06 | 50 | 276 | — | — | — |
| 35. | I | 5.5 | 1 | 1.68 | 4.32 | 3.43 | 20 | 110 | — | 108.8 | Small uniform cells |
| 36. | I | 5 | 1 | 1.69 | 3.93 | 3.89 | 30 | 110 | — | 125.4 | Small uniform cells |
| 37. | N | 6 | 1 | 1.67 | 9.69 | 2.69 | ~30 | 300 | 1.9 | 191.6 | Expanded 5 times, Collapsed to 3 times, Non-uniformity Observed. |
| 38. | N | 3 | 1 | 1.75 | 4.85 | 6.09 | 60 | 300 | 0.66 | 205.8 | Uniform. |
| 39. | M | 11 | 1 | 1.54 | 1.53 | 3.80 | — | 5 | 1.3 | 219.3 | Expanded and partially collapsed. |

TABLE I-continued

| No. | Polymer | X | Y | Weight % Amine | NCO SH | Moles Water Excess | Start Gassing Seconds | Sponge Time Seconds | Average Cell Size, mm | Density kg/m³ | Comments |
|---|---|---|---|---|---|---|---|---|---|---|---|
| 40 | O | 3 | 1 | 1.75 | 11.4 | 5.30 | 60 | 420 | 0.7 | 253.9 | Non-uniformity observed. Uniform. |
| 41. | M | 10 | 1 | 1.56 | 1.39 | 5.16 | 5 | 60 | 1.0 | 263.3 | Expanded and partially collapsed. Non-uniformity observed. |
| 42. | L | 3 | 1 | 1.75 | 1.55 | 1.36 | 60 | — | 0.4 | 268.0 | Uniform. |
| 43. | M | 12 | 1 | 1.52 | 1.67 | 3.01 | ~1 | 60 | 1.5 | 276.3 | Expanded, partially collapsed and then continued to expand. Non-uniformity observed. |
| 44. | C | 6 | 1 | 1.67 | 1.87 | 5.18 | ~10 | 60 | 1.1 | 309.8 | Non-uniformity observed. |
| 45. | C | 8 | 1 | 1.61 | 2.50 | 3.02 | ~10 | 60 | 1.5 | 318.9 | Non-uniformity observed. |
| 46. | O | 4.5 | 1 | 1.71 | 17.1 | 3.42 | 30 | 240 | 2.1 | 368.3 | Expanded, partially collapsed and then expanded. Relatively uniform. |
| 47. | O | 6 | 1 | 1.67 | 22.8 | 2.53 | ~20 | 300 | 2.4 | 427.8 | Non-uniform. |
| 48. | N | 1.5 | 1 | 1.80 | 2.42 | 16.5 | 60 | 600 | 0.1 | 722.1 | Uniform. |
| 49. | M | 6 | 1 | 1.67 | 0.84 | 0.00 | — | — | — | — | Not cross-linked Insufficient diisocyanate. Comparative example. |
| 50. | M | 8 | 1 | 1.61 | 1.11 | 17.7 | ~1 | 300 | — | — | Expanded, but not completely crosslinked. |
| 51. | P | 7 | 1 | 1.64 | 2.49 | 3.46 | 10 | 30 | — | — | Collapsed |
| 52. | Q | 3 | 1 | 1.75 | 5.17 | 5.99 | 90 | 360 | — | — | Small amount of expansion. |

EXAMPLE 2

A series of sponges were prepared using diphenylmethane-4,4'-diisocyanate in place of tolylene diisocyanate.

A. A first mixture of 50 parts of Polymer A and 19 parts of diphenylmethane-4,4'-diisocyanate was prepared and a second mixture of 1 part of triethylamine and 3 parts of water. These two mixtures were mixed as described in Example 1. The results were as shown in Table II.

B. A sponge was prepared as described by A. above, except 17 parts of diphenylmethane-4,4'-diisocyanate was used in place of the 19 parts.

C. A sponge was prepared as described by A. above, except 15 parts of diphenylmethane-4,4'-diisocyanate was used in place of the 19 parts.

D. A sponge was prepared as described by A. above, except 13 parts of diphenylmethane-4,4'-diisocyanate was used in place of the 19 parts.

TABLE II

| No. | NCO SH | Moles Water Excess | Start Gassing Seconds | Sponge Time Seconds | Density kg/m³ | Comments |
|---|---|---|---|---|---|---|
| A. | 7.90 | 1.26 | 6 | 32 | 82.7 | — |
| B. | 7.07 | 1.43 | 15 | 40 | 90.5 | Slight collapse observed. |
| C. | 6.24 | 1.65 | 20 | 45 | 126.9 | Slight collapse observed. |
| D. | 5.40 | 1.97 | 25 | 48 | 161.2 | Slight collapse observed. |

EXAMPLE 3

A. A sponge was prepared by making a first mixture of 50 parts of Polymer D, 11 parts of tolylene diisocyanate, 0.5 part of a solution of chloroplatinic acid in isopropanol which contained 0.63 weight percent platinum, and 2 parts of lamp black and a second mixture of one part of triethylamine and 3 parts of water. These two mixtures were mixed as described in Example 1 and the results were as shown in Table III.

B. A sponge was prepared by making a first mixture of 50 parts of Polymer A, 9 parts of tolylene diisocyanate, and 0.5 part of a fluorinated alkyl ester surfactant, and a second mixture of one part of triethylamine and 3 parts of water. These two mixtures were combined as described in Example 1 and the results were as shown in Table III.

C. A sponge was prepared by making a first mixture of 50 parts of Polymer A and 8.5 parts of tolylene diisocyanate, and a second mixture of one part of tetramethylguanidine and 3 parts of water. These two mixtures were combined as described in Example 1 and the results were as shown in Table III.

D. A sponge was prepared as described in C. above, except N,N-dimethylbenzylamine was substituted for the tetramethylguanidine.

E. A sponge was prepared by making a first mixture of 50 parts of Polymer M and 12 parts of tolylene diisocyanate and a second mixture of one part of triethylamine, 3 parts of water, and 2 parts of an alkylphenoxypolyethoxyethanol surfactant. These two mixtures were combined as described in Example 1 and the results were as shown in Table III.

F. An attempt to prepare a sponge was made by making a first mixture of 50 parts of Polymer I and 6 parts of tolylene diisocyanate, and a second mixture of one part of triethylamine, 3 parts of water, and 2 parts of the surfactant of E. above. These two mixtures were combined as described in Example 1 and the results were as shown in Table III.

G. An attempt to prepare a sponge was made as described in F. above, except 0.5 part of the surfactant was used in place of the 2 parts.

H. An attempt to prepare a sponge was made as described in F. above, except about 0.02 part of the surfactant was used in place of the 2 parts. F., G. and H. showed that a surfactant is not required and may cause a sponge to collapse, therefor the selection of surfactant and amount of surfactant should be made by trying it on a small scale before using on a large production scale.

I. An attempt to prepare a sponge from a mercapto polymer having pendent mercapto groups was made by making a first mixture of 50 parts of a mercapto-functional polydiorganosiloxane represented by the general formula

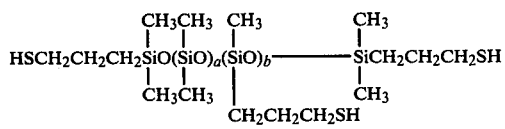

having 0.78 weight percent mercapto group and a viscosity of 0.00147 square meters per second and 2.5 parts of tolylene diisocyanate, and a second mixture of one part of triethylamine and 3 parts of water. These two mixtures were combined as described in Example 1 but gelled within 10 seconds and showed only a slight evidence of expansion. F., G., H. and I. are presented as comparative illustrations.

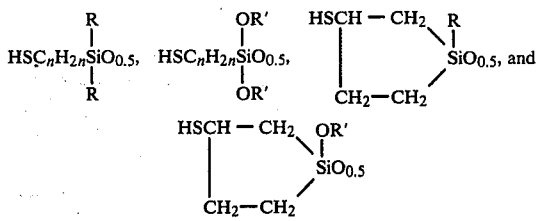

wherein the polydiorganosiloxane has organic radicals selected from phenyl radicals and alkyl radicals of one to four inclusive carbon atoms, where at least 50 percent of the organic radicals of the polydiorganosiloxane are alkyl radicals, each R is phenyl radical or an alkyl radical of one to four inclusive carbon atoms, each R' is an alkyl radical of one to three inclusive carbon atoms, n is an integer of from 2 to 4 inclusive, there being more than one mole of isocyanate group from the organic diisocyanate for each mole of mercapto group from the mercapto-functional polydiorganosiloxane, and there being at least one mole of water for each mole of isocyanate in excess of one mole of isocyanate group per mole of mercapto group.

2. The method in accordance with claim 1 in which the mercapto-functional polydiorganosiloxane is a fluid.

3. The method in accordance with claim 2 in which the catalyst is a tertiary organic amine.

4. The method in accordance with claim 3 in which the organic diisocyanate is present in an amount sufficient to provide from 3 to 10 inclusive moles of isocyanate group for each mole of mercapto group.

5. The method in accordance with claim 3 in which

TABLE III

| No. | NCO SH | Moles Water Excess | Start Gassing Seconds | Sponge Time Seconds | Average Cell Size, mm | Density kg/m$^3$ | Comments |
|---|---|---|---|---|---|---|---|
| A. | 4.73 | 1.67 | 10 | 45 | 0.5 | 41.8 | — |
| B. | 5.37 | 1.98 | 15 | 75 | — | 65.7 | — |
| C. | 5.08 | 2.12 | 8 | 75 | 1.1 | 100.0 | Fairly uniorm. |
| D. | 5.08 | 2.12 | 65 | 300 | 1.9 | 171.4 | Expanded for 210 seconds, collapsed some and then expanded to 300 seconds. Non-uniform. |
| E. | 1.67 | 3.01 | 10 | 60 | 1.3 | 180.5 | Expanded for 30 seconds, partially collapsed and then expanded to 60 seconds. Non-uniform. |
| F. | 4.72 | 3.06 | 8 | — | — | — | Collapsed after 35 seconds. |
| G. | 4.72 | 3.06 | 8 | — | — | — | Collapsed after 35 seconds, but expanded some thereafter. |
| H. | 4.72 | 3.06 | 8 | — | — | — | Collapsed after 35 seconds, but expanded more than G. thereafter. |
| I. | 2.43 | 9.86 | >300 | — | — | — | Cured to a rubber product without forming a sponge. |

That which is claimed is:

1. A method of preparing a sponge comprising combining a mercaptofunctional polydiorganosiloxane, an organic diisocyanate, and a catalyst such that a homogeneous mixture is formed, contacting the homogeneous mixture with water in the liquid state promoting foaming and cross-linking, and thereafter recovering a sponge, said mercapto-functional polydiorganosiloxane consisting essentially of a polydiorganosiloxane endblocked with organosiloxy units selected from units represented by unit formulae the mercapto-functional polydiorganosiloxane and organic diisocyanate are mixed to form a first mixture, the organic amine and water are mixed to form a second mixture and thereafter the two mixtures are thoroughly blended and a sponge is obtained.

6. The method in accordance with claim 4 in which the mercapto-functional polydiorganosiloxane and organic diisocyanate are mixed to form a first mixture, the organic amine and water are mixed to form a second mixture, and thereafter the two mixtures are thoroughly blended and a sponge is obtained.

7. The method in accordance with claim 6 in which the amine is present in an amount of at least 0.75 weight percent based on the combined weight of the first mixture and the second mixture.

8. The method in accordance with claim 3 in which the mercapto-functional polydiorganosiloxane has a degree of polymerization such that the average number of diorganosiloxane units is in the range of from 3 to 800.

9. The method in accordance with claim 6 in which the mercapto-functional polydiorganosiloxane has a degree of polyermization such that the average number of diorganosiloxane units is in the range of from 3 to 800.

10. The method in accordance with claim 1 in which the organic diisocyanate is tolylene diisocyanate and the catalyst is triethylamine.

11. The method in accordance with claim 3 in which the organic isocyanate is tolylene diisocyanate and the organic amine is triethylamine.

12. The method in accordance with claim 9 in which the organic diisocyanate is tolylene diisocyanate and the organic amine is triethylamine.

13. The method in accordance with claim 12 in which the triethylamine is present in an amount of at least one weight percent based on the combined weight of the first mixture and the second mixture.

14. A sponge obtained from the method of claim 1.

15. A sponge obtained from the method of claim 2.

16. A sponge obtained from the method of claim 3.

17. A sponge obtained from the method of claim 12.

* * * * *